US008755472B2

(12) United States Patent
Sun et al.

(10) Patent No.: US 8,755,472 B2
(45) Date of Patent: Jun. 17, 2014

(54) HIGH SENSITIVITY GPS RECEIVER

(71) Applicant: QUALCOMM Incorporated, San Diego, CA (US)

(72) Inventors: Qinfang Sun, Cupertino, CA (US); Wen-Chang Yeh, Sinpu Township, Hsinchu County (TW); Ho-Chung Chen, Taipei (TW)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/937,757

(22) Filed: Jul. 9, 2013

(65) Prior Publication Data

US 2013/0294549 A1 Nov. 7, 2013

Related U.S. Application Data

(62) Division of application No. 13/549,406, filed on Jul. 13, 2012, now Pat. No. 8,509,362, which is a division of application No. 12/145,918, filed on Jun. 25, 2008, now Pat. No. 8,270,457.

(60) Provisional application No. 60/946,675, filed on Jun. 27, 2007.

(51) Int. Cl.
*H04L 27/06* (2006.01)

(52) U.S. Cl.
USPC ............ 375/343; 375/340; 375/376; 375/354

(58) Field of Classification Search
USPC .......................................................... 375/340
See application file for complete search history.

(56) References Cited

U.S. PATENT DOCUMENTS

| 3,917,999 | A | | 11/1975 | Gutleber |
| 5,668,832 | A | * | 9/1997 | Yamamoto ..................... 375/233 |
| 5,768,112 | A | * | 6/1998 | Barrett ............................ 363/16 |
| 5,983,160 | A | * | 11/1999 | Horslund et al. ............. 701/472 |
| 6,121,923 | A | | 9/2000 | King |
| 6,289,041 | B1 | | 9/2001 | Krasner |
| 6,441,780 | B1 | | 8/2002 | Rog et al. |
| 6,480,150 | B2 | | 11/2002 | Falk et al. |

(Continued)

FOREIGN PATENT DOCUMENTS

| TW | 444129 B | 7/2001 |
| WO | 0010030 | 2/2000 |

OTHER PUBLICATIONS

International Preliminary Report on Patentability—PCT/US2008/068317, The International Bureau of WIPO, Jan. 5, 2010.

(Continued)

*Primary Examiner* — Lihong Yu
(74) *Attorney, Agent, or Firm* — Mahamedi Paradice Kreisman LLP

(57) ABSTRACT

A high sensitivity GPS receiver includes an acquisition engine and a tracking engine. The acquisition engine processes GPS satellite data at data rate that is substantially equal to twice the coarse acquisition (CA) code chip rate. This data rate advantageously enables the acquisition engine to process GPS satellite data with relatively less hardware area than traditional GPS acquisition approaches. In one embodiment, the high efficiency acquisition engine may be over-clocked, thereby allowing different phases of a CA code to be correlated quickly. The tracking engine can advantageously process GPS satellite data at a data rate that does not have an integer relationship to the CA code chip rate.

21 Claims, 10 Drawing Sheets

(56) References Cited

U.S. PATENT DOCUMENTS

| | | |
|---|---|---|
| 6,611,757 B2 | 8/2003 | Brodie |
| 7,216,006 B2 * | 5/2007 | Yasui et al. .................. 700/54 |
| 7,705,778 B2 | 4/2010 | Sun et al. |
| 8,018,378 B2 | 9/2011 | Sun et al. |
| 8,270,457 B2 | 9/2012 | Sun et al. |
| 2001/0009563 A1 | 7/2001 | Kohli et al. |
| 2002/0071503 A1 | 6/2002 | Myers |
| 2003/0081660 A1 | 5/2003 | King et al. |
| 2003/0128747 A1 | 7/2003 | Poon et al. |
| 2004/0202235 A1 | 10/2004 | Kohli et al. |
| 2005/0219985 A1 | 10/2005 | Nakahira |
| 2005/0243897 A1 | 11/2005 | Lomp et al. |
| 2005/0265430 A1 | 12/2005 | Ozluturk et al. |

OTHER PUBLICATIONS

International Preliminary Report on Patentability—PCT/US2009/003674, The International Bureau of WIPO, Jan. 5, 2011.

International Search Report and Written Opinion—PCT/US2008/068317, ISA/US, Aug. 29, 2008.

International Search Report and Written Opinion—PCT/US2009/003674, ISA/US, Aug. 21, 2009.

Supplementary European Search Report—EP08796022, Search Authority, Munich, Apr. 7, 2011.

Taiwanese Search Report —TW098121426—Search Authority—TIPO—Aug. 23, 2010.

* cited by examiner

HIGH SENSITIVITY GPS RECEIVER

RELATED APPLICATIONS

This application is a divisional of and claims the benefit under 35 USC 120 of U.S. patent application Ser. No. 13/549,406 entitled "High Sensitivity GPS Receiver" filed Jul. 13, 2012, which is a divisional of and claims the benefit under 35 USC 120 of U.S. patent application Ser. No. 12/145,918, entitled "High Sensitivity GPS Receiver" filed Jun. 25, 2008, now U.S. Pat. No. 8,270,457 B2, which claims priority under 35 USC 119 of U.S. Provisional Patent Application 60/946,675, entitled "High Sensitivity GPS Receiver" filed Jun. 27, 2007, the entireties of all of which are incorporated by reference herein.

TECHNICAL FIELD

The present embodiments generally relate to satellite navigation receivers and more particularly to high sensitivity GPS receivers.

BACKGROUND OF RELATED ART

Global positioning system (GPS) receivers typically use data from three or more orbiting satellites to determine navigational information such as position and velocity. There may be up to thirty functional satellites included in the GPS constellation, however, only a portion of those satellites may be visible to a particular GPS receiver at a given time. GPS satellites typically transmit information on two bands: the L1 band with a carrier frequency of approximately 1575.42 MHz and the L2 band with a carrier frequency of approximately 1227.40 MHz. Traditionally, only authorized users have been able to use data transmitted on the L2 band. In the future, civilian GPS signals may be transmitted on the L2 band and the L5 band (approximately 1176.45 MHz). However, low cost GPS receivers typically receive only on the one of these bands. The following descriptions use the L1 band to describe exemplary embodiments; however, other embodiments may be implemented using other GPS bands.

GPS satellites transmit data using a form of spread spectrum coding known as code division multiple access (CDMA). Each satellite is assigned a coarse acquisition (CA) code that resembles pseudo random noise and is unique to that satellite. Each satellite encodes data using the satellite's own CA code and transmits encoded data on the L1 carrier frequency. Thus, all satellites are simultaneously transmitting data on the shared carrier frequency. Each CA code consists of a sequence of 1023 "chips" where each chip is assigned a value of one or zero. The CA code is transmitted at a rate of 1.023 MHz; therefore, each chip period is approximately 0.977 us. Each satellite continually transmits a repeating pattern consisting of the satellite's own CA code. The GPS satellite may encode navigational or system data by inverting the transmitted CA code. CA code phase is the relationship of a CA code either to a reference clock or to other CA codes transmitted by other satellites. Although the CA code phase may be synchronized between satellites at the time of transmission, the CA codes may be received with differing delays at the GPS receiver due to different propagation times. Typically, a GPS receiver determines which CA codes are being received in order to determine which GPS satellites are in view.

There are many impediments to receiving signals from GPS satellites. GPS satellites orbit the earth with a period of approximately twelve hours. Thus, the signals from the satellites will always have some Doppler induced distortion. In addition, the L1 band is substantially a line-of-sight frequency band, i.e. the signals transmitted at those frequencies generally travel by line-of-sight, and may be easily blocked by buildings or terrain, and more prone to multipath distortion. Other interference sources that may impede signal reception are thermal noise, atmospheric propagation interference, and so forth. As is well-known, the GPS satellite signal is relatively weak compared to other radio frequency communication signals. Therefore, GPS satellite signal reception may be further hindered when the GPS receiver is inside of a building because the roof and walls of the structure may reduce the amount of satellite signal received.

There has always been a need for smaller and cheaper GPS receivers. As the size and cost of GPS receivers has decreased, manufacturers have integrated more GPS receivers into more products. For example, current GPS receivers are small enough to fit within cellular phones. However, still other product opportunities may present themselves as GPS receivers become even smaller. Furthermore, many consumer product opportunities are typically cost-sensitive. Therefore, relatively lower cost GPS receivers may be included in relatively more new consumer product designs.

As the foregoing illustrates, what is needed in the art is a high sensitivity GPS receiver with a relatively lower cost.

SUMMARY

A high-sensitivity GPS receiver can include an antenna, an analog section for receiving an output of the antenna, a digital section for receiving an output of the analog section, and a processor for receiving an output of the digital section. Notably, the digital section can include a plurality of acquisition channels, wherein at least one acquisition channel can include a configurable correlator. This configurable correlator can include a pre-summer, a delay line, a plurality of correlation multipliers, an adder tree, an adder, and a correlation memory. The pre-summer can receive resampled digital baseband data, remove Doppler effects, and add two data samples of Doppler-corrected, digital baseband data. In one embodiment, the pre-summer can include a mixer coupled to the resampled digital baseband data and an estimated Doppler frequency, a register coupled to an output of the mixer, and a first adder coupled to an output of the mixer and an output of the register.

The delay line can receive an output of the pre-summer. This delay line can include a plurality of registers connected in a daisy-chain and a plurality of tap points provided between certain registers. For example, in one embodiment, one tap point is provided after a first register of the plurality of registers and thereafter other tap points are provided after every other register. The correlation multipliers can receive outputs of the tap points. In one embodiment, a number of correlation multipliers can be one-half the number of registers. The adder tree can receive outputs from the correlation multipliers. The adder can receive an output of the adder tree. The correlation memory can receive an output of the adder and provide an input to the adder. The configurable correlator can further include a code memory, wherein each correlation multiplier receives a coarse acquisition code stored in the code memory. In one embodiment, a final stage of the adder tree can be configured to a width that accommodates a full sum with a desired precision.

A second configurable correlator for an acquisition channel in a GPS receiver is also described. This second configurable correlator can include a first processing stage, one or more subsequent processing stages, a plurality of correlation multipliers, a plurality of adder tree sections, a plurality of multiplexers, a multiplexer selector, an additional adder tree section, a two-to-one multiplexer, a final adder, and a correlation memory.

The first processing stage can include a pre-summer section and a delay line section, wherein the pre-summer section provides an output to the delay line section. Each subsequent processing stage can include a pre-summer section, a stage multiplexer, and a delay line section, wherein each stage multiplexer can receive an output of a corresponding pre-summer section and provide an output to a corresponding delay line section. The stage multiplexer in a first subsequent processing stage further receives an output of the delay line section of the first processing stage, and in any other subsequent processing stage, the stage multiplexer further receives an output of a delay line section from an upstream processing section. Each pre-summer section can include a mixer receiving resampled digital baseband data and an estimated Doppler frequency, a register receiving an output of the mixer, and a first adder receiving an output of the mixer and an output of the register. Each delay line section can include a plurality of registers connected in a daisy-chain and a plurality of tap points between certain of the plurality of registers.

In the second configurable correlator, each correlation multiplier can be coupled to a tap point. Each adder tree section can receive outputs from a corresponding set of correlation multipliers. Each multiplexer can receive an output of a corresponding adder tree section. The multiplexer selector can receive an output from each of the plurality of multiplexers. The additional adder tree section can also receive an output from each of the plurality of multiplexers. The two-to-one multiplexer can receive outputs from the multiplexer selector and the additional adder tree section. The final adder can receive an output of the two-to-one multiplexer. The correlation memory can receive an output of the final adder, wherein an output of the correlation memory is provided to the final adder. In one embodiment, the configurable correlator has 16 processing stages and each delay line section includes 33 tap points.

A method of acquiring a GPS satellite signal is also described. In this method, a coherent integration period can be set. Then, coarse coherent integration can be performed for the set coherent integration period to determine a first correlation value. This first correlation value can be compared to a high threshold, wherein the high threshold corresponds to a strong positive correlation between a received GPS signal and a coarse acquisition code, a code phase, and an estimated Doppler frequency. If the first correlation value is greater than the high threshold, then fine coherent integration can be performed to refine the coarse acquisition code, the code phase, and the estimated Doppler frequency.

On the other hand, if the first correlation value is not greater than the high threshold, then the first correlation value can be compared to a low threshold, wherein the low threshold corresponds to a weak positive correlation between a received GPS signal and a coarse acquisition code, a code phase, and an estimated Doppler frequency. When the first correlation value is not greater than the low threshold, then the method can determine whether the set coherent integration period is at a maximum duration. When the set coherent integration period is at the maximum duration, then the set coherent integration period can be increased and the method can return to performing coarse coherent integration.

When the first correlation value is greater than the low threshold, then the method can determine whether the first correlation value is a false trigger. If the first correlation value is not a false trigger, then the method can proceed to performing fine coherent integration. However, if the first correlation value is a false trigger, then the method can determine whether the set coherent integration period is at the maximum duration. When the set coherent integration period is at the maximum duration, then a non-coherent integration period can be set. At this point, coarse non-coherent integration can be performed for the set non-coherent integration period to generate a second correlation value.

In one embodiment, performing coarse non-coherent integration can include calculating an intermediate correlation value using a largest possible coherent correlation time and accumulating multiple intermediate correlation values based on more than one coarse non-coherent integration. The accumulated, multiple intermediate correlation values can form the second correlation value.

The method can further include determining whether the second correlation value is greater than a predetermined threshold, wherein the predetermined threshold corresponds to a strong positive correlation between a received GPS signal and a coarse acquisition code, a code phase, and an estimated Doppler frequency. When the second correlation value is greater than the predetermined threshold, then fine non-coherent integration can be performed to refine the coarse acquisition code, the code phase, and the estimated Doppler frequency.

When the second correlation value is not greater than the predetermined threshold, then the method can determine whether the set non-coherent integration period is at a maximum duration. If the set non-coherent integration period is not at the maximum duration, then the set non-coherent integration period can be increased and the method can return to performing coarse non-coherent integration. On the other hand, if the set non-coherent integration period is at the maximum duration, then the method can terminate with an acquisition failure.

A method of tracking a GPS satellite signal is also described. In this method, a pull-in stage can be executed. At this point, the method can determine whether a PLL loop has converged. In one embodiment, determining whether the PLL loop has converged can include comparing a change in an average PLL output with its root-mean-square variation. If the PLL loop has not converged, then the method can return to executing the pull-in stage.

However, if the PLL loop has converged, then the method can determine whether the PLL loop has false convergence. In one embodiment, determining whether the PLL loop has false convergence includes comparing a power of an in-phase component to a power of a quadrature component of a frequency- and phase-corrected GPS satellite signal. If the PLL loop does not have false convergence, then a transition stage can be executed by decreasing the PLL loop bandwidth and increasing the integration time relative to previous PLL loop bandwidths and integration times.

After the transition stage, the method can determine whether the PLL loop has converged (second occurrence). If the PLL loop has converged, then a tracking stage can be executed. If the PLL loop has not converged, then the method can return to executing the transition stage.

Note that when the PLL loop does have false convergence, then the method can determine whether the PLL is set to its last possible setting. If the PLL is not set to its last possible setting, then another PLL setting can be used and the method can return to executing the pull-in stage. However, if the PLL is set to its last possible setting, then the method can terminate.

The tracking method can further include determining whether the PLL loop is diverging. If the PLL loop is diverging, then the method can return to executing the pull-in stage.

However, if the PLL loop is not diverging, then the method can return to executing the tracking stage.

DETAILED DESCRIPTION

Figure 1:
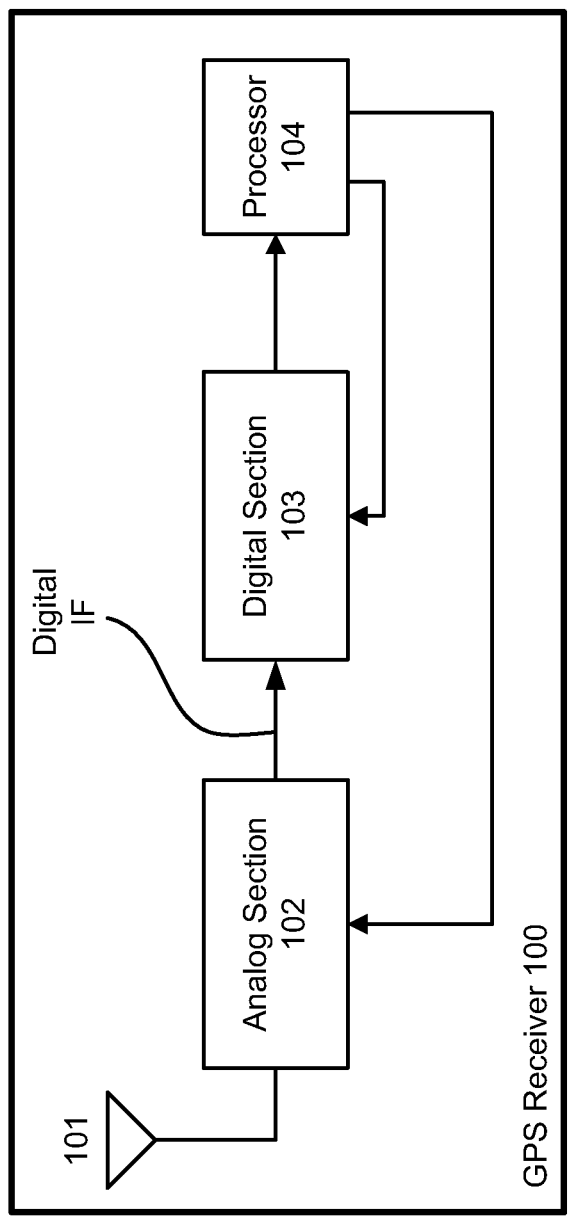
FIG. 1 is a conceptual diagram of a GPS receiver.

FIG. 1 is a conceptual diagram of a GPS receiver 100. GPS receiver 100 includes, without limitation, an antenna 101, an analog section 102, a digital section 103, and a processor 104. GPS satellite signals are received by antenna 101 and are coupled to an input of analog section 102. Analog section 102 processes the GPS satellite signals and produces a digital intermediate frequency (IF) signal by sampling the GPS satellite signal with an analog to digital converter (ADC). In one embodiment, the sample rate may be approximately 16 megasamples per second (Ms/s). The digital IF signal is coupled to the input of digital section 103. Digital section 103 uses the digital IF signal to acquire and track satellites from within the GPS satellite constellation by producing acquisition and tracking data that is coupled to processor 104. Processor 104 may be a central processing unit CPU, a microprocessor, a digital signal processor, or any other such device that may read and execute programming instructions. Processor 104 analyzes the acquisition and tracking data to determine navigation information such as location and velocity.

Figure 2:
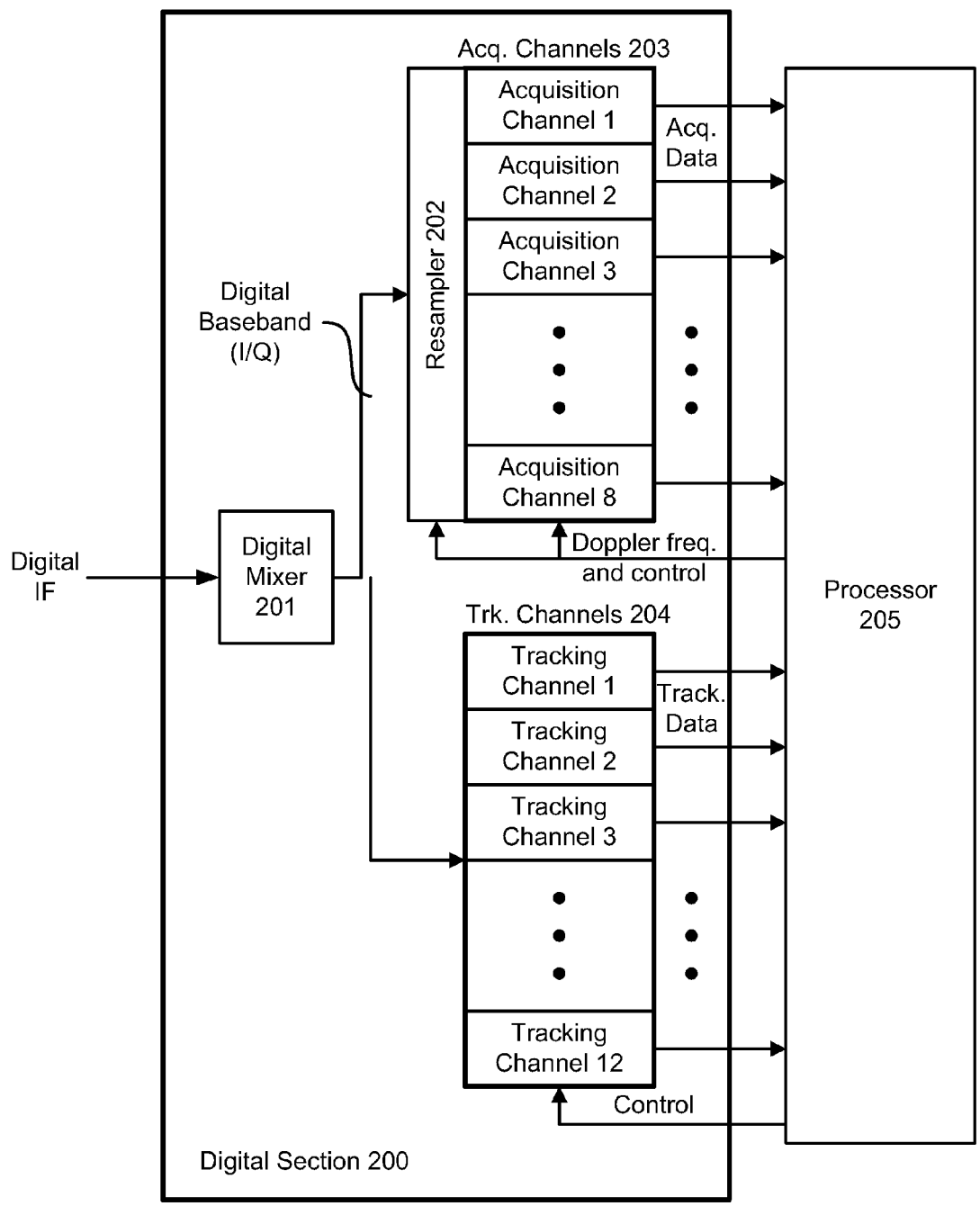
FIG. 2 is a more detailed conceptual diagram of the digital section and the processor of a GPS receiver.

FIG. 2 is a more detailed conceptual diagram of a digital section 200 of a GPS receiver. Digital section 200 includes, without limitation, a digital mixer 201, a resampler 202, acquisition channels 203, and tracking channels 204. The digital IF signal from the analog section of the GPS receiver is coupled to digital mixer 201. Digital mixer 201 mixes the digital IF signal with a digital local oscillator (LO) signal (not shown) and produces a digital baseband signal. In one embodiment, the digital baseband signal may include both in-phase (I) and quadrature (Q) components. Because, in one embodiment, the digital IF signal is sampled at a rate of approximately 16 Ms/s, the digital baseband signal is also approximately 16 Ms/s.

The digital baseband signal is coupled to both resampler 202 and tracking channels 204. In one embodiment, digital section 103 includes eight acquisition channels 203 and twelve tracking channels 204. In operation, each acquisition and tracking channel may be assigned to process data for a particular GPS satellite. For example, an acquisition channel 203 may be used to analyze GPS satellite data and determine if a particular satellite is within view of the GPS receiver while a tracking channel 204 may be used to track a different GPS satellite that may have been previously acquired. The acquisition data generated by acquisition channels 203 and the tracking data generated by tracking channels 204 are coupled to a processor 205. Processor 205 may execute programming instructions stored within a memory (not shown) and control and configure resampler 202, acquisition channels, 203, and tracking channels 204 based on the analysis of the acquisition and tracking data.

Figure 3A:
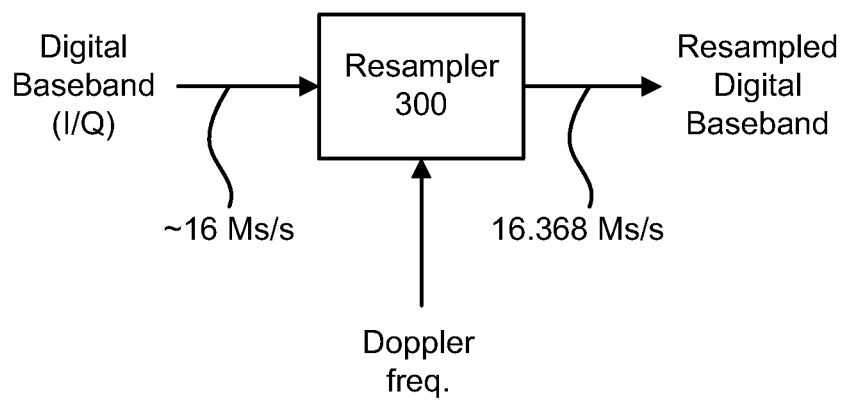
FIGS. 3A and 3B are more detailed conceptual diagrams of the resampler of a GPS receiver.

FIG. 3A is more detailed conceptual diagram of a resampler 300 for a digital section. Methods for resampling data from a first sampling rate to a second sampling rate are generally well-known in the art. As shown in FIG. 3A, a digital baseband signal is coupled to an input of resampler 300. Resampler 300 resamples the digital baseband signal and produces a resampled digital baseband data with a sample rate that is substantially equal to 16 times the chip rate of 1.023 Ms/s, or approximately 16.368 Ms/s.

In one embodiment, resampler 300 may resample the digital baseband signal data with a multi-tap, finite impulse response (FIR) filter whose coefficients may be determined by, in part, a Doppler frequency associated with a GPS satellite. In another embodiment, the FIR filter may be a two-point linear interpolator. The Doppler frequency may be an estimated Doppler frequency used during GPS satellite signal acquisition and may be supplied by the processor. The estimated Doppler frequency may be selected from a list of all possible Doppler frequencies. For example, the estimated Doppler frequency may be the lowest Doppler frequency on the list. Subsequent Doppler frequency estimates may be relatively greater frequencies. The output of resampler 300 can be coupled to all acquisition channels.

Figure 3B:
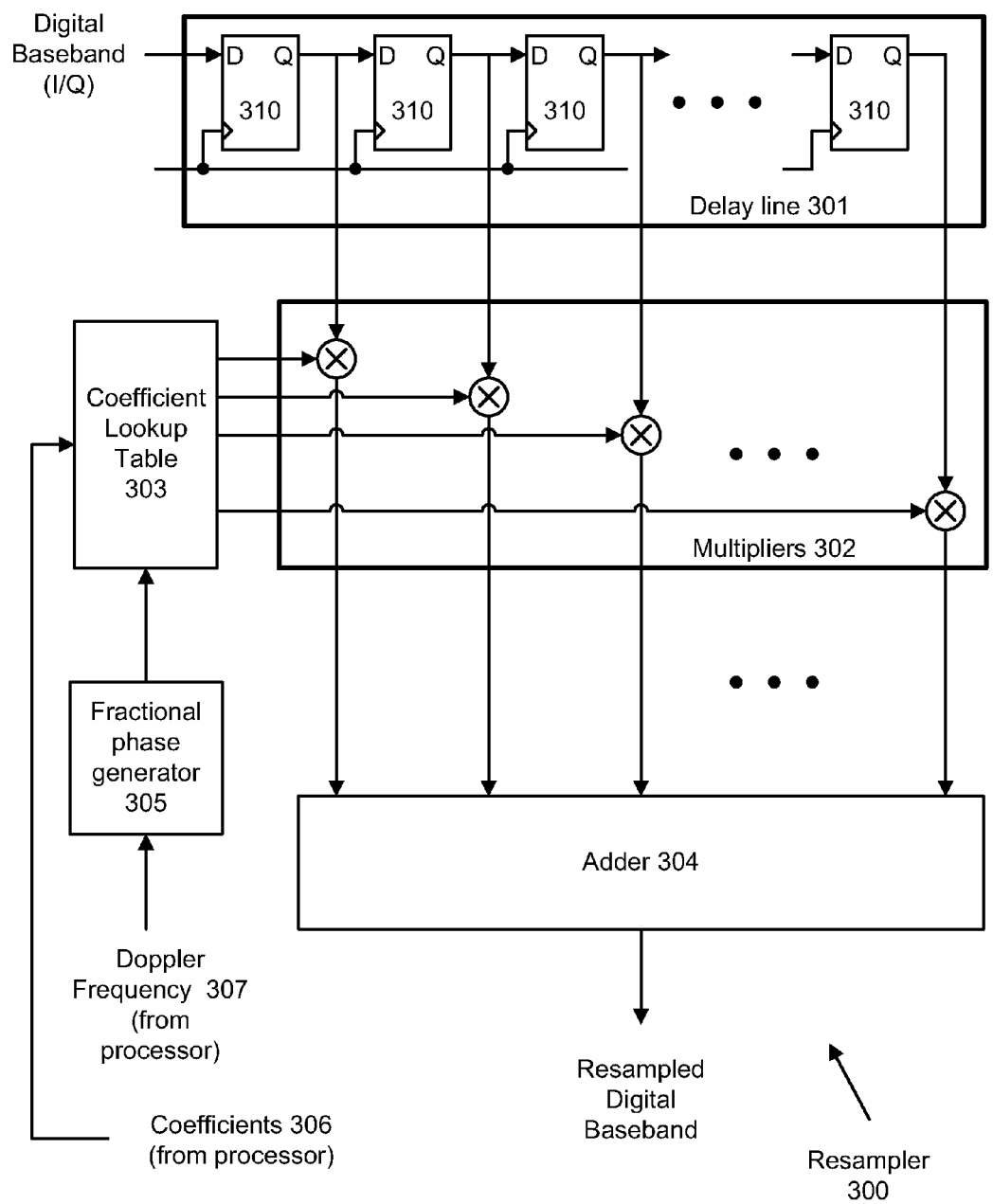

FIG. 3B shows an exemplary embodiment of resampler 300, according to the specification. Resampler 300 includes, without limitation, a delay line 301, multipliers 302, a coefficient lookup table 303, an adder 304, and a fractional phase generator 305 configured as a FIR filter. Resampler 300 resamples data from a first data rate to a second data rate by multiplying old data points by coefficients and producing a weighted sum. Coefficients 306 may be determined by the processor and loaded into coefficient lookup table 303. Fractional phase generator 305 determines which coefficients are used by analyzing factors such as the estimated Doppler frequency and the relationship between the input and output data rate. Fractional phase generator 305 selects the coefficients from coefficient lookup table 303.

Although FIG. 3B shows a single bit data path coupling the digital baseband signal to delay line 301, the actual data path may be many bits wide. For example, flip-flops 310 implementing delay line 301 may be realized with multi-bit registers. In one embodiment, the data path is wide enough to support the data from the digital mixer.

Delay line 301 may include two or more registers (e.g. flip-flops 310) configured in a daisy-chain fashion, as shown. Coefficient lookup table 303 supplies the coefficients to one input of each of multipliers 302. Data from delay line 301 is coupled to the other input of each of multipliers 302. The outputs of multipliers are coupled to adder 304. The output of adder 304 is resampled digital baseband data. The estimated Doppler frequency 307 is coupled to the input of fractional phase generator 305. The output of fractional phase generator 305 is coupled to coefficient lookup table 303. Fractional phase generator 305 and coefficient lookup table 303 determine the coefficients used in the resampling computation. In one embodiment, coefficient lookup table 303 may be random access memory (RAM). Using a RAM to implement lookup table 303 advantageously lets the user easily modify the exact coefficients used in the FIR filter.

Figure 4:
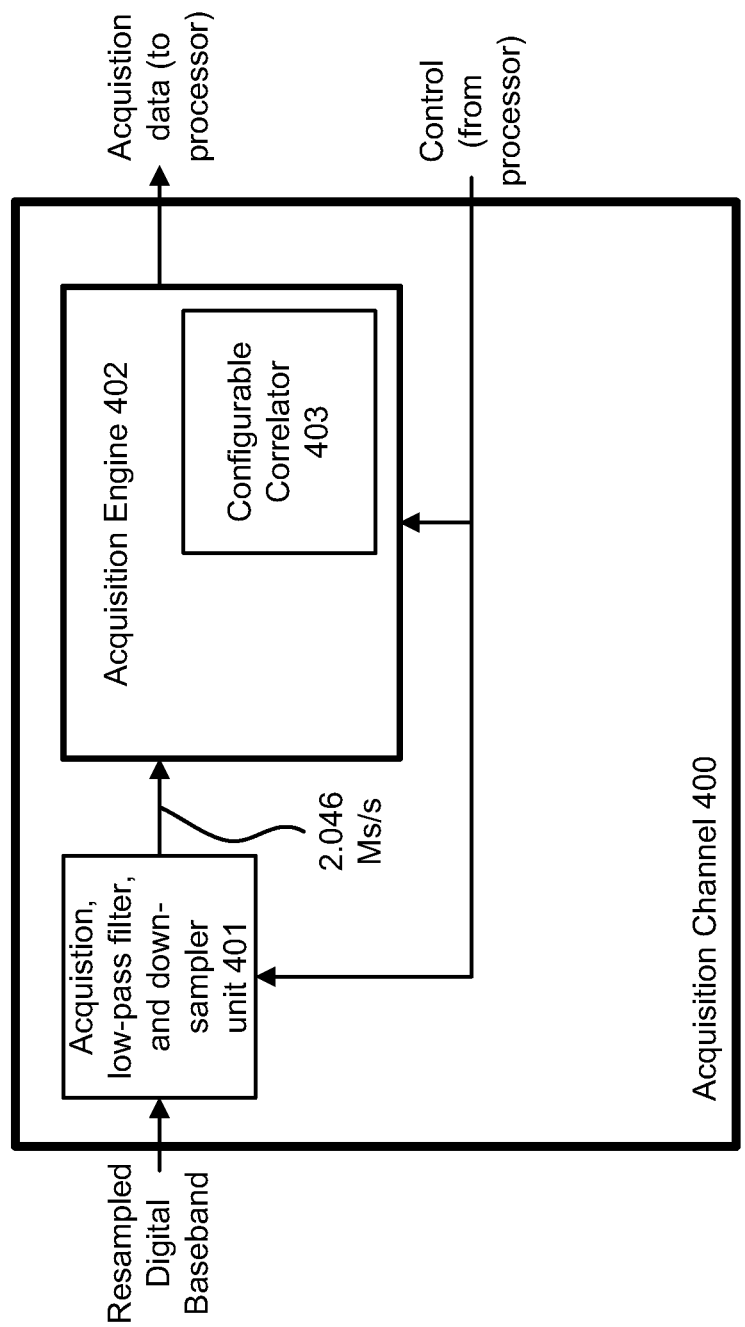
FIG. 4 shows a more detailed conceptual diagram of the acquisition channel of a GPS receiver.

FIG. 4 shows a more detailed conceptual diagram of an exemplary acquisition channel 400 that can be used to implement acquisition channels 203 (FIG. 2). Acquisition channel 400 can include, without limitation, an acquisition, low-pass filter, and down-sampler unit 401 and an acquisition engine 402. Acquisition, low-pass filter, and down-sampler unit 401 reduces the resampled digital baseband data from the resampler (e.g. resampler 300 of FIG. 3) to a rate substantially equal to double the chip rate (e.g. 2.046 Ms/s). As is well-known, down-sampling from 16.368 Ms/s to 2.046 Ms/s may produce aliased GPS data. Therefore, the resampled digital baseband data can be low-pass filtered prior to down sampling to remove out-of-band data that may result in aliasing.

Down-sampling may be implemented by any well-known method, such as by filtering and sample dropping or simply sample dropping. In one embodiment, the down-sampler may be implemented with a multi-tap FIR filter whose coefficients may be determined, in part, by estimated Doppler information supplied by the processor. In one embodiment, the down-sampler can be tuned for twice the chip rate, which is used in configurable correlator 403 (described below). The output of acquisition, low-pass filter, and down-sampler unit 401 can be coupled to acquisition engine 402.

In one embodiment, resampler 300 and acquisition, low-pass filter, and down-sampler unit 401 may be replaced by a single unit that incorporates the functionality of both components. This combined functionality unit may offer some area savings compared to the discrete approach described here.

Acquisition engine 402 can "acquire" a GPS satellite by correlating the resampled digital baseband data with known CA codes using a configurable correlator. Note that a processor can provide control signals to acquisition, low-pass filter, and down-sampler unit 401 and acquisition engine 402.

Figure 5:
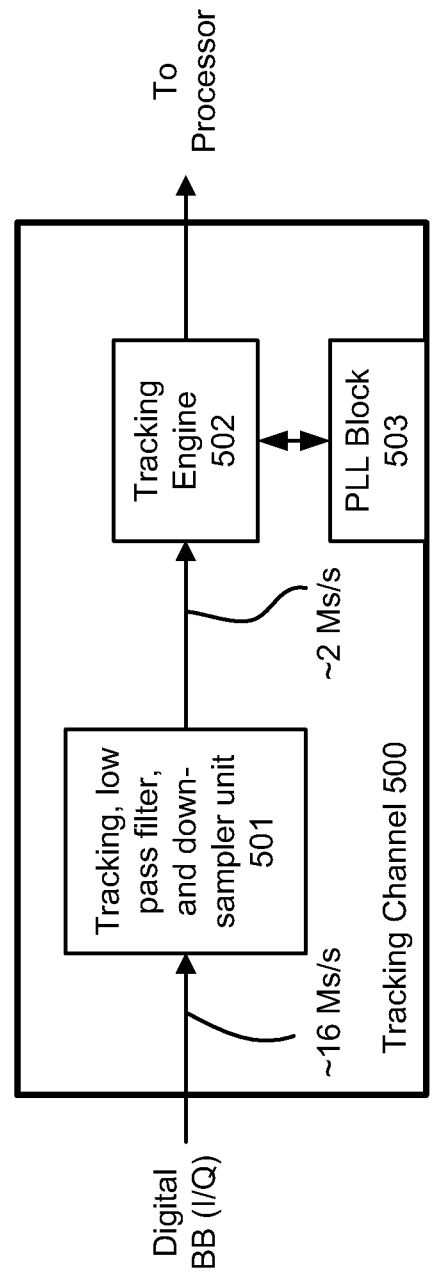
FIG. 5 is a more detailed conceptual diagram of the tracking channel of a GPS receiver.

FIG. 5 is a more detailed conceptual diagram of a tracking channel 500 that can be used to implement tracking channels 204 (FIG. 2). Tracking channel 500 can include, without limitation, a tracking, low-pass filter, and down-sampler unit 501, a tracking engine 502, and a phase lock loop (PLL) block 503. The digital baseband signal from a digital mixer (e.g. digital mixer 201 of FIG. 2) is coupled to the input of tracking, low-pass filter, and down-sampler unit 501 that reduces the data rate of the output of the digital mixer by approximately one-eighth. In one embodiment, operation of tracking, low-pass filter, and down-sampler unit 501 may be substantially similar to operation of acquisition, low-pass filter, and down-sampler unit 401 (FIG. 4).

Because the data rate from the digital mixer is approximately 16 Ms/s, the output rate of tracking, low-pass filter, and down-sampler unit 501 is approximately 2 Ms/s. In one embodiment, the output rate of tracking, low-pass filter, and down-sampler unit 501 is greater than twice the chip rate or 2.046 Ms/s. An output rate that does not have an integer relationship to the chip rate may help track GPS satellites by distributing data sampling points at different times within the chip periods.

The low-pass filtered, down-sampled data is coupled to the input of tracking engine 502. PLL block 503 is coupled to tracking engine 502. In one embodiment, PLL block 503 may be implemented as a combination of a PLL and a delay lock loop (DLL) or simply a PLL. Tracking engine 502 can track GPS satellites by converging on both the Doppler frequency of the received GPS signal and the code phase of the CA code received from a selected satellite (described in greater detail below in conjunction with FIG. 9).

Figure 6:
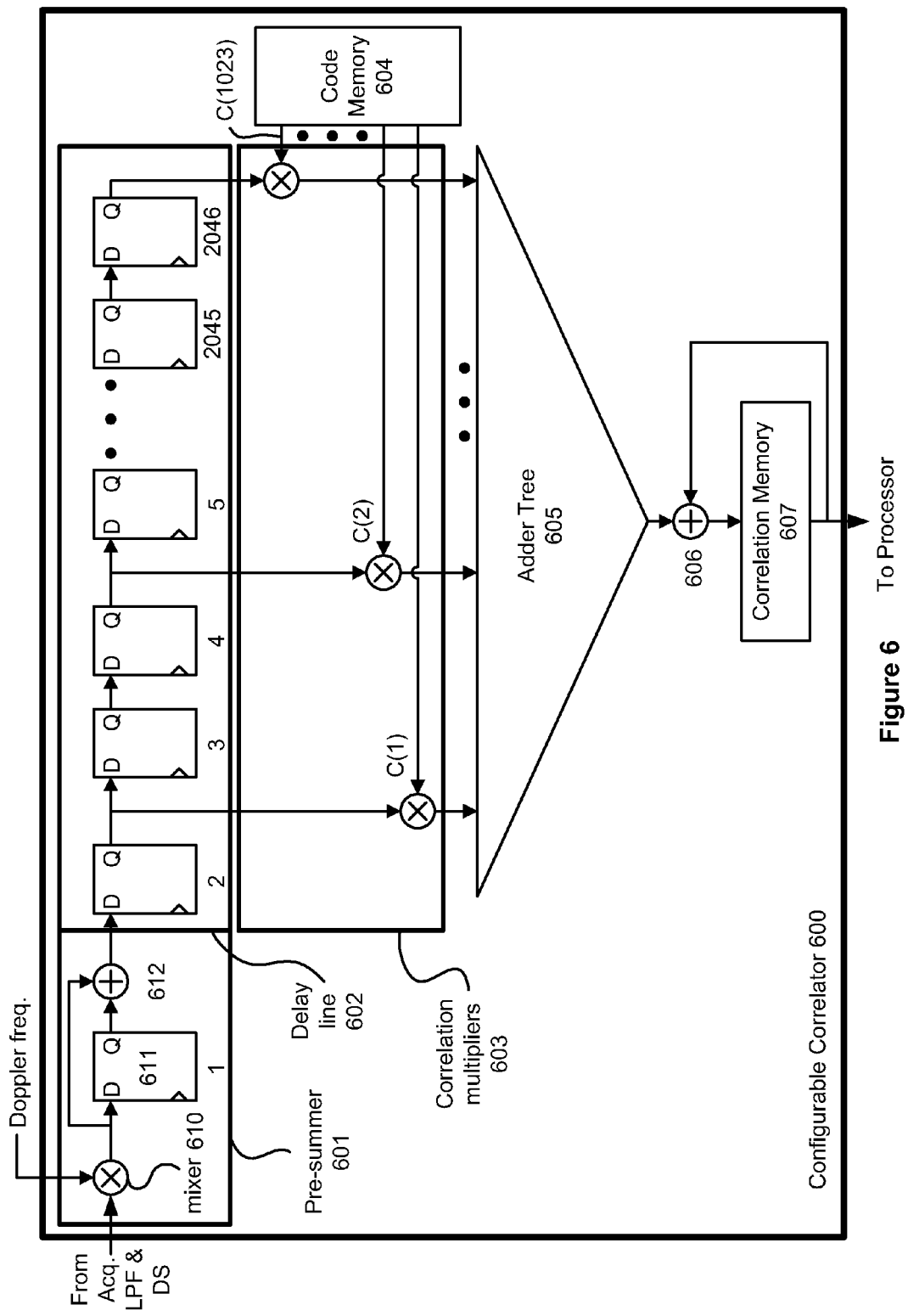
FIG. 6 is a conceptual diagram of one embodiment of a configurable correlator, according to the specification.

FIG. 6 is a conceptual diagram of one embodiment of a configurable correlator 600 according to the specification. Configurable correlator 600 includes, without limitation, a pre-summer 601, a delay line 602, correlation multipliers 603, code memory 604, an adder tree 605, an adder 606, and correlation memory 607. Configurable correlator 600 can correlate GPS satellite data with a CA code, a particular code phase, and an estimated Doppler frequency producing a correlation value. Generally, a larger correlation value indicates a stronger relationship between these four elements. Although FIG. 6 shows the width of the data path as a single bit wide, the actual data path width may be made as wide as required to accommodate the data in the acquisition channel, which may be related to the width of the ADC.

The resampled digital baseband data from an acquisition low-pass filter, and down-sampler unit (e.g. acquisition, low-pass filter, and down-sampler unit 401 of FIG. 4) is coupled to pre-summer 601. In one embodiment, pre-summer 601 can include a mixer 610, a register 611, and an adder 612. Mixer 610 can remove the Doppler effects by multiplying a phase ramp value determined by the estimated Doppler frequency with the resampled digital baseband data. One input of mixer 610 is the resampled digital baseband data and the other input is the estimated Doppler frequency. The output of mixer 610 is a Doppler corrected baseband digital data stream at 2.046 Ms/s. In one embodiment, the estimated Doppler frequency may be supplied by the processor. The output of mixer 610 is coupled to the input of register 611 and one input of adder 612. The output of register 611 is coupled to another input of adder 612. In this configuration, pre-summer 601 adds together two data samples of the Doppler corrected, digital baseband data stream.

As described below, using pre-summer 601 can advantageously reduce the number of correlation multipliers needed to correlate a complete CA code with one-half chip precision. Because the CA code includes 1023 chips, 1023 correlation multipliers 603 can be used for correlation. Without pre-summer 601, 2046 correlation multipliers would be needed to correlate the 1023 chips (i.e. there are 2046 samples representing the 1023 chips because the baseband digital data stream is at twice the chip rate). Because the baseband digital data stream is 2.046 Ms/s, the resolution of configurable correlator 600 is one-half chip period. Correlating data points positioned between chip periods (i.e. one-half chip periods) may provide relatively finer correlation granularity.

The output of pre-summer 601 is coupled to the input of delay line 602. In one embodiment, delay line 602 can be an array of 2045 registers, wherein the output of one register is coupled to the input of another register in a daisy-chain fashion as shown in FIG. 6. The output of every other register of delay line 602 is coupled to one input of one of the 1023 correlation multipliers 603. The other input of each of correlation multipliers 603 is coupled to code memory 604. Code memory 604 may store different CA codes representing different GPS satellites as well as different code phases that may be determined by different arrangements of the CA codes in the code memory.

In one embodiment, correlation multipliers 603 may be implemented with exclusive-or (XOR) devices. A single bit wide data path may implement the XOR functionality with a single XOR gate. If the width of the data path is greater than a signal bit, the XOR devices may include gates and other components as required to implement the XOR functionality.

The outputs of correlation multipliers 603 are coupled to adder tree 605. In one embodiment, the top of adder tree 605 (i.e. the first stage of adder tree 605) may be only a few bits wide (i.e. wide enough to accommodate the data width of the data from the delay line multiplied by the CA code). Toward the bottom of adder tree 605 (i.e. the final stage of adder tree 605), the width of adder tree 605 may be increased to accommodate the full sum with the desired precision. The output of adder tree 605 is coupled to one input of adder 606. The output of correlation memory 607 is coupled to another input of adder 606. The output of adder 606 is coupled to correlation memory 607. This arrangement between correlation memory 607 and adder 606 allows the correlation results to be easily accumulated, if desired.

In one embodiment, configurable correlator 600 may be over-clocked (i.e. the fundamental clock rate may be greater than the data rate). In such a configuration, multiple CA codes may be correlated to a single set of data samples, thereby reducing the time required to correlate different satellite CA codes or code phases to an incoming GPS satellite data stream.

In another embodiment, configurable correlator 600 may be over-clocked and partial CA codes correlated with a partial adder tree. In such an arrangement, correlation memory 607 may store a partial sum of a first partial correlation that may be added to the sum of a second partial correlation. The partial adder tree may be relatively smaller compared to adder tree 605 of FIG. 6, thereby advantageously saving area.

A traditional acquisition engine may include many one-tap correlators, one to correlate each possible code phase of interest. Each one-tap correlator may include an adder many bits wide (i.e., full precision to accommodate the full correlation value). Because there may be many such one-tap correlators, the overall area may be very large compared to the area of the adder tree structure set forth above.

In one embodiment, configurable correlator 600 may be modified to correlate multiple partial code phases instead of a single CA code phase of 1023 chips. This configuration is particularly useful for GPS satellite reacquisition. Consider an event when a previously acquired GPS satellite is temporarily obscured from the view of the GPS receiver. Because a particular satellite has been previously acquired, the CA code of that satellite is known. The exact code phase may not be known, however. To reacquire the GPS satellite, the code phase may be quickly determined by only correlating a portion of the complete CA code. To correlate portions of the CA code, delay line 602 may be divided into sections with multiplexers. In a first configuration, the multiplexers may separate the delay line into sections sized for correlating partial CA codes. In a second configuration, the multiplexers may allow all the delay line sections to be daisy chained, thereby allowing operation similar to that of delay line 602. Furthermore, adder tree 605 may be decentralized and distributed so that either partial CA codes or a complete CA code may be correlated.

Figure 7:
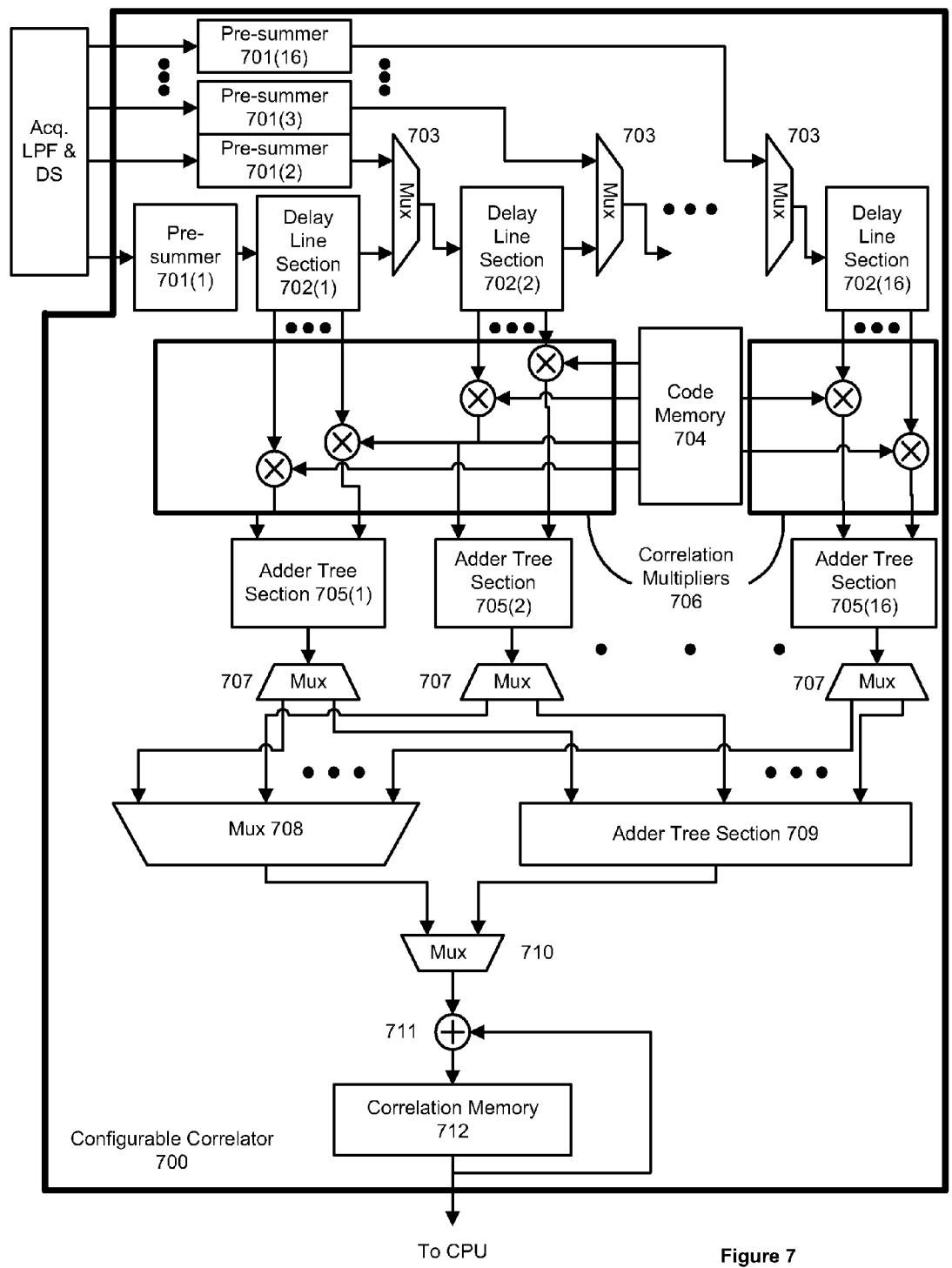
FIG. 7 is a conceptual diagram of an alternative embodiment of the configurable correlator, according to the specification.

FIG. 7 is a conceptual diagram of an alternative embodiment of a configurable correlator 700 according to the specification. The configurable correlator includes, without limitation, pre-summers 701 (i.e. 701(1)-701(16)), delay line sections 702 (i.e. 702(1)-702(16)), multiplexers 703/707/708/710, code memory 704, adder tree sections 705 (i.e. 705(1)-705(16))/709, correlation multipliers 706, an adder 711, and correlation memory 712. Although in this embodiment there are sixteen delay line sections, sixteen pre-summers and seventeen adder tree sections, more generally, configurable correlator 700 includes n delay line sections, n pre-summers, and n+1 adder tree sections.

In contrast to delay line 602 (FIG. 6), the delay line of FIG. 7 is divided into n (wherein n=16) delay line sections 702. With the exception of the last delay line section, the output of each delay line section 702 is coupled to one input of a delay line input multiplexer 703. The output of each pre-summer 701 is coupled to another input of a delay line input multiplexer 703. In one embodiment, each pre-summer 701 is substantially similar to pre-summer 601 (FIG. 6). Finally, the output of each delay line input multiplexer is coupled to the input of another delay line section 702. This arrangement of delay line input multiplexers 703, delay line sections 702, and pre-summers 701 allows the delay line to be configured as a long delay line or as several smaller delay lines.

Thus, configurable correlator 700 can be characterized as including a first processing section and one or more subsequent processing sections. The first processing section can include pre-summer 701(1) and delay line section 702(1). Each subsequent processing section can include a pre-summer, a multiplexer receiving an output of the pre-summer, and a delay line section receiving an output of the multiplexer. For example, pre-summer 701(2), delay line section 702(2), and the multiplexer 703 between those components form a first subsequent processing section.

When configured as a long delay line, delay line sections 702 form a delay line that may be similar in length to delay line 602 (FIG. 6). In one embodiment, each delay line section 702 includes thirty-three taps, wherein each tap includes two registers. A delay line section 702 with thirty-three taps provides approximately 32 ms of correlation timing range, which may be sufficient for GPS satellite reacquisition. Thus, sixteen delay line sections 702 can form a delay line of 528 taps (which is approximately one-half of the number of taps described in FIG. 6).

As described above, the delay line length may be extended by over-clocking. For example, if the delay line is twice over-clocked, the effective length becomes 1,056 taps (which is approximately the delay line length shown in FIG. 6).

As shown in FIG. 7, the outputs of delay line sections 702 are coupled to respective inputs of correlation multipliers 706. Code memory 704 is coupled to the other inputs of correlation multipliers 706. In one embodiment, correlation multipliers 706 may be implemented with (XOR) devices. The outputs of correlation multipliers 706 are coupled to the inputs of adder tree sections 705. Specifically, in one embodiment, the adder tree of FIG. 7 may be partitioned such that the upper portion of the adder tree is divided into n adder tree sections 705 whose inputs are coupled to the outputs of correlation multipliers 706. The lower portion of the adder tree of FIG. 7 is included in adder tree section 709 (thus, configurable correlator 700 includes n+1 adder tree sections).

Each output of an adder tree section 705 can be coupled to a respective input of an adder tree output multiplexer 707. Adder tree output multiplexers 707 couple outputs from adder tree sections to an n-to-one selector multiplexer 708 and to adder tree section 709. The outputs of multiplexer 708 and adder tree section 709 are coupled to inputs of a two-to-one selector multiplexer 710. The output of multiplexer 710 is coupled to one input of adder 711. The output of adder 711 is coupled to the input of correlation memory 712. The output of correlation memory 712 is coupled to the second input of adder 711 and the processor.

Configurable correlator 700 may be configured to correlate a complete CA code, which is useful when acquiring a GPS satellite. When configured to correlate a complete CA code, data from the acquisition, low-pass filter, and down-sampler unit is coupled to pre-summer 701(1). In this configuration, the other pre-summer units are not used and their outputs are ignored. The output of pre-summer 701(1) is coupled to delay line section 702(1). Delay line input multiplexers 703 are configured to couple the output of one delay line section 702 to the input of another delay line section 702, thereby forming a relatively longer delay line capable of supporting the length of a complete CA code. The outputs of delay line sections 702 are coupled to the correlation multipliers in a manner similar to that described in FIG. 6. The CA code from code memory 704 is also coupled to correlation multipliers 706 and the outputs of correlation multipliers 706 are coupled to adder tree sections 705(1) though 705(16). In this configuration, adder tree sections 705 function similarly to adder tree 605 (FIG. 6). Adder tree output multiplexers 707 couple the outputs of adder tree sections 705(1) through 705(16) to adder tree section 709, thereby adding the outputs of correlation multipliers 706 and producing a correlation value similar to the correlation number produced by configurable correlator 600 (FIG. 6). Multiplexer 710 can selectively couples the output of adder tree section 709 to adder 711. The CPU may access correlation values through the output of correlation memory 712.

Configurable correlator 700 may also be configured to correlate a partial CA code, which is useful when re-acquiring a GPS satellite. A satellite may need reacquisition when the data stream from a GPS satellite, which has been previously acquired, becomes temporarily lost or interrupted. Because the GPS satellite was previously acquired, the CA code for a particular satellite is known; however, the code phase (i.e. the relationship between the CA code and the local clock) may have changed due to Doppler effects, relative motion, and/or the performance of the local clock source. In order to determine the code phase, only a portion of the CA code may need correlation. Configurable correlator 700 may be configured to correlate one or more different code phases of a given CA code.

To correlate one or more partial CA codes, the acquisition, low-pass filter, and down-sampler unit can be coupled to the input of all pre-summers 701. As was described in conjunction with FIG. 6, pre-summers 701 can correct for the Doppler effect and add two samples of the GPS data stream together. Delay line input multiplexers 703 couple the output of pre-summers 701 to corresponding delay line sections 702. Thus, in this configuration, the delay line sections 702(1) through 702(16) are independent of each other and each delay line section may correlate a separate partial CA code.

The length of the delay line section determines the length of the partial CA code that is correlated. Thus, in one configuration, n delay line sections may correlate n partial CA codes. In an alternate configuration, two or more delay line sections may be daisy-chained, thereby enabling the correlation of longer partial CA codes. Configurable correlator 700 supports mixed partial CA code lengths in which differing numbers delay line sections are daisy-chained. For example, delay line section 702(1) may correlate a first partial CA code, delay line sections 702(2) and 702(3) may correlate a second partial CA code, and delay line sections 702(4), 702(5) and 702(6) may correlate a third partial CA code.

The output of correlation multipliers 706 are coupled to adder tree sections 705(1) through 705(16). Adder tree output multiplexers 707 couple the outputs of adder tree sections 705 to inputs of multiplexer 708. Multiplexer 708 selectively couples an output from one of adder tree sections 705 to multiplexer 710, which in turn selectively couples that input to correlation memory 712. This configuration advantageously correlates many different partial CA code phases relatively quickly.

Figure 8:
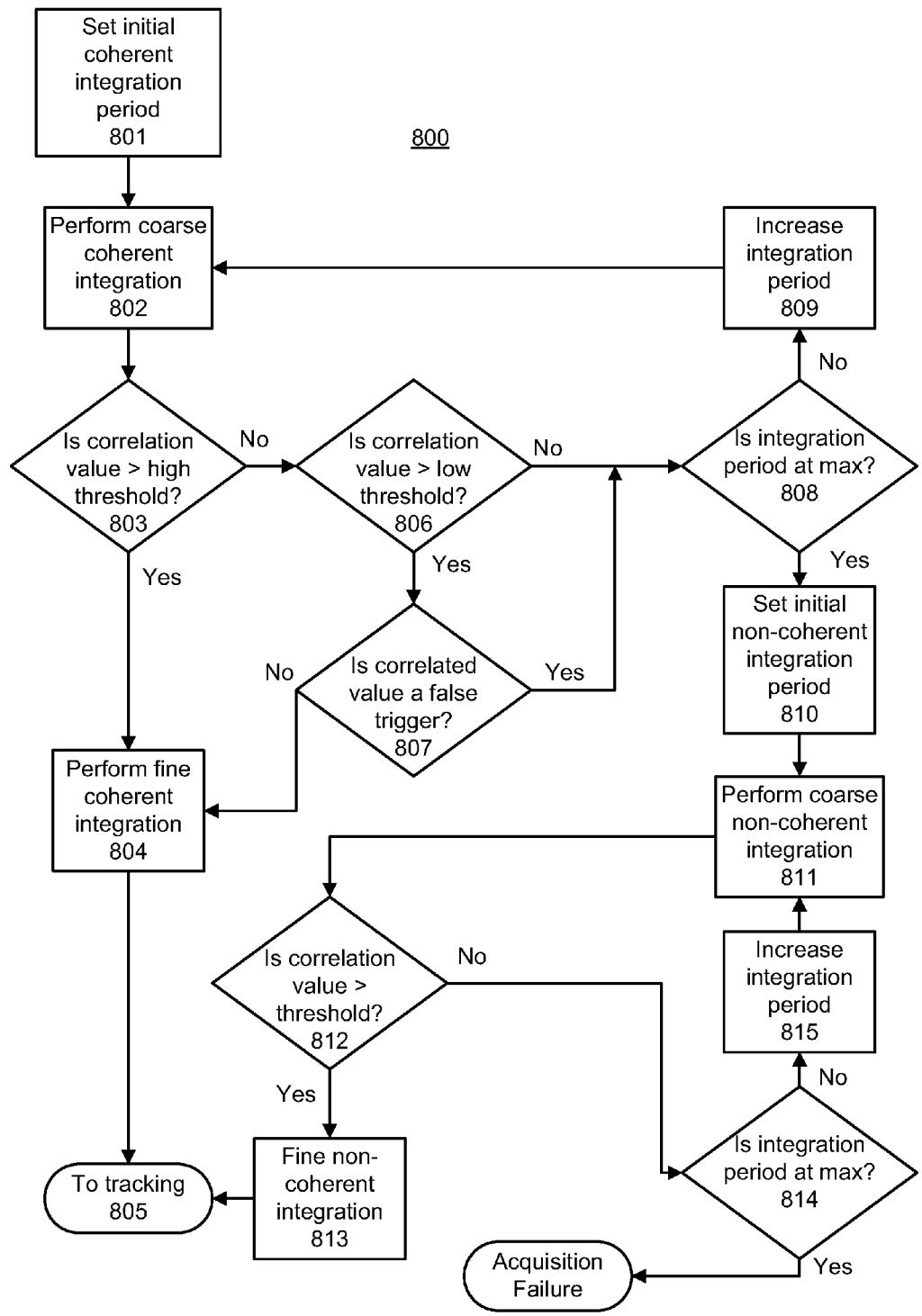
FIG. 8 is a flow chart of method steps for acquiring a GPS satellite signal, according to the specification.

FIG. 8 is a flow chart of an acquisition technique 800 for acquiring a GPS satellite signal, according to the specification. Persons skilled in the art will recognize that any system configured to perform the method steps in any order is within the scope of the present embodiments.

In step 801, the acquisition engine sets an initial coarse coherent integration period, i.e. the period of time during which the correlation value between the received GPS signal and a selected CA code is calculated. In step 802, the acquisition engine performs coarse coherent integration by searching for the largest correlation peak (i.e. correlation value) over possible Doppler frequencies, CA codes, and code phases for the selected integration period. The acquisition engine selects estimated Doppler frequencies, CA codes, and code phases from a pre-determined set derived from all possible Doppler frequencies, CA codes, and code phases. As is well-known, the longer the integration period, the greater the signal-to-noise ratio of the correlation value.

In step 803, the acquisition engine determines if the coarse coherent correlation value is greater than a high correlation threshold, i.e. a correlation value indicating a strong positive correlation between the received GPS signal and the selected CA code, selected code phase, and estimated Doppler frequency. Note that the high correlation threshold represents a correlation value noticeably greater than the peak-to-average ratio of correlation values for incorrect Doppler frequency or code phases estimates. Thus, correlation values greater than the high correlation threshold have a small likelihood of being the result of noise.

If the coarse coherent correlation value is greater than the high correlation threshold then, in step 804, the acquisition engine performs fine coherent integration. Fine coherent integration, in contrast to coarse coherent integration described in step 802, refines Doppler estimates, CA codes, and code phase by searching near the vicinity of the correlation value peak determined in step 803. After completing fine coherent integration, the method ends in step 805 by proceeding to the tracking algorithm (described in reference to FIG. 9).

If, on the other hand, in step 803 the coarse coherent correlation value is not greater than the high correlation threshold, then the method proceeds to step 806 where the acquisition engine determines if the coarse coherent correlation value is greater than a low correlation threshold. Similar to the high coherent correlation threshold, the low correlation threshold is a correlation value that indicates that there may be a possible correlation between the received GPS signal and the selected CA code at the estimated Doppler frequency. The low correlation threshold, in contrast to the high correlation threshold, is close to the peak-to-average ratio of the correlation values related to poor Doppler and code phase estimates. The exact threshold values depend on implementation. Because the low coherent correlation threshold is relatively easier to satisfy than the high coherent correlation threshold, the acquisition engine may perform further qualification of the correlation value, as is described below in step 807.

If the coherent correlation value is not greater than the low coherent correlation threshold, then in step 808, the acquisition engine determines if the coarse coherent integration period is set to the maximum duration. In one embodiment, the maximum duration is twenty milliseconds. Persons skilled in the art will recognize that twenty milliseconds is equivalent to the period of one bit time. Extending a coarse coherent integration period beyond one bit time may introduce errors because of a possible sign change that may occur when crossing a bit boundary. The initial coarse coherent integration period set during step 801 is typically less than the maximum coarse coherent integration period. If the coarse coherent integration period is not set to the maximum duration, then in step 809 the acquisition engine increases the coarse coherent integration period and the method returns to step 802. In one embodiment, the coarse coherent integration period is increased through a series of predetermined settings. An example of predetermined settings is 4 ms, 10 ms, 16 ms and 19 ms.

Returning to step 806, if the acquisition engine determines that the coherent correlation value is greater than the low correlation threshold, then in step 807, the acquisition engine determines if the coarse coherent correlation value represents a false trigger. A false trigger condition occurs when the correlation value (determined in step 806) is greater than the low correlation threshold, but does not correspond to the correct Doppler frequency and code phase. There may be other correlation values greater than the low correlation threshold. False trigger checking analyzes a pre-determined number of top peaks local to the current selected code phase and estimated Doppler frequency using longer correlation durations. If the maximum correlation value from the false trigger check exceeds a threshold, then the acquisition engine records the corresponding Doppler frequency and code phase and the method proceeds to step 804. If, on the other hand, the coarse coherent correlation value is a false trigger, then the method proceeds to step 808.

Returning to step 808, if the acquisition engine determines that the duration of the coarse coherent integration period is equal to the maximum duration, then in step 810, the acquisition engine selects an initial non-coherent integration period. In one embodiment, the initial non-coherent period is four segments of 19 ms or 76 ms. Next, in step 811 the acquisition engine performs coarse non-coherent integration. Coarse non-coherent integration includes two sub-steps. In the first sub-step, the acquisition engine calculates a correlation value using the largest possible coherent correlation time. In the second sub-step, the acquisition engine accumulates amplitude or power of multiple correlation values by performing non-coherent correlation multiple times. In one embodiment, the non-coherent correlation period may be the equivalent of several bit times. Next, in step 812, the acquisition engine determines if the non-coherent correlation value is greater than a non-coherent correlation threshold. If the non-coherent correlation value is greater than the non-coherent correlation threshold, then in step 813 the acquisition engine performs fine non-coherent integration. Similar to step 804 above, step 813 also reduces the error in Doppler frequency and code phase estimates by performing a search near the correlation peak. The method then ends in step 805 by proceeding to the tracking algorithm.

Returning to step 812, if the acquisition engine determines that the non-coherent correlation value is not greater than the non-coherent correlation threshold, then in step 814, the acquisition engine determines if the non-coherent correlation period is set to the maximum period. In one embodiment, the maximum period may be 16 times 19 ms (i.e. 256 ms). If the maximum period has not been reached, then in step 815 the acquisition engine increases the non-coherent correlation duration. For a substantial increase in signal-to-noise ratio of the correlation value, the subsequent correlation duration typically needs to be at least twice as long. If, on the other hand, the maximum duration has been set, then the method terminates with an acquisition failure.

Note GPS satellite acquisition method 800 may also be used for GPS satellite reacquisition. For reacquisition, the acquisition engine can configure configurable correlator 700 (FIG. 7) such that partial CA codes are correlated through the delay line sections 702.

Figure 9:
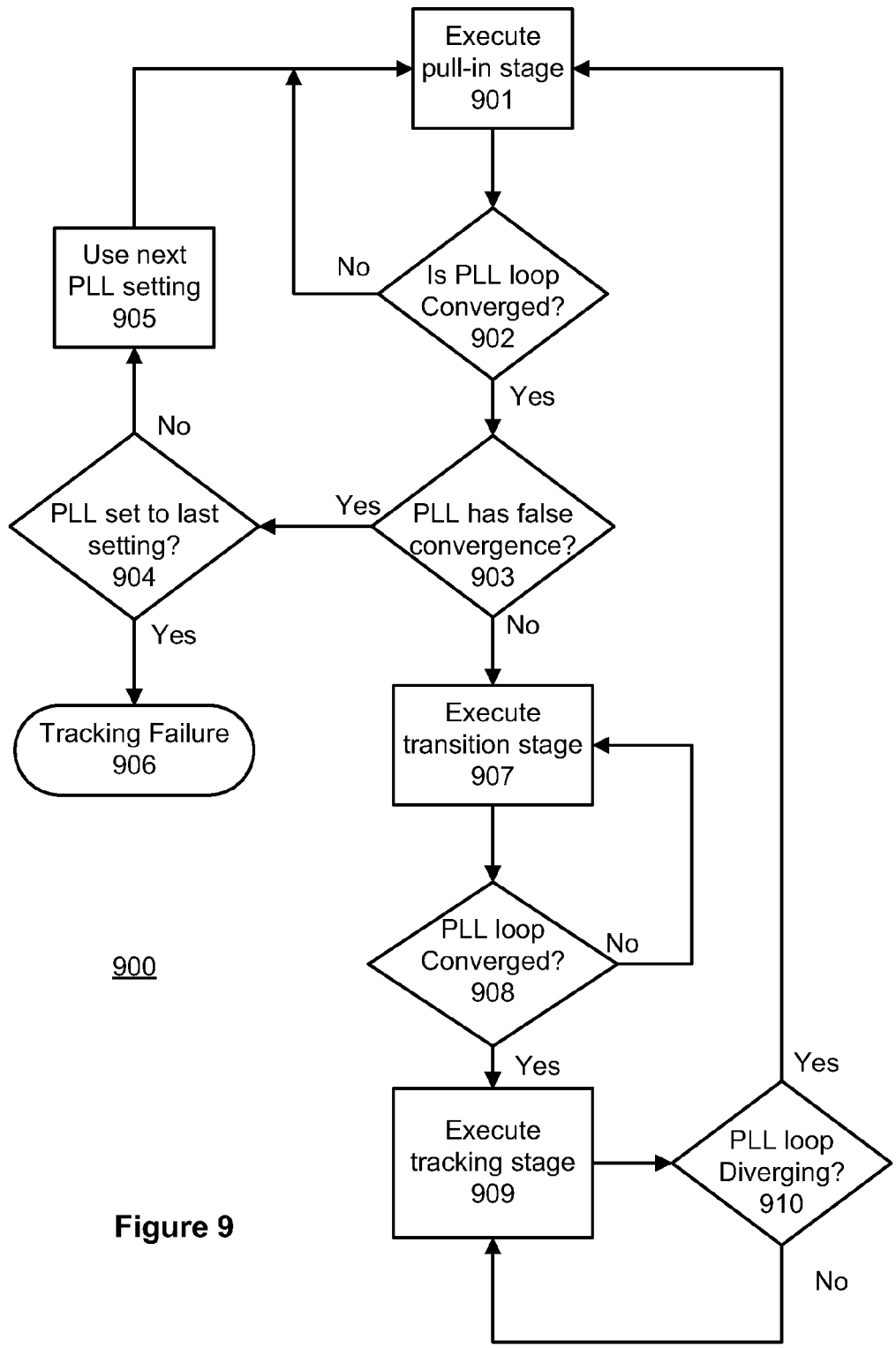
FIG. 9 is a flow chart of method steps for tracking a GPS satellite signal, according to the specification.

FIG. 9 is a flow chart of a tracking technique 900 for tracking a GPS satellite signal, according to the specification. Persons skilled in the art will recognize that any system configured to perform the method steps in any order is within the scope of the present embodiments.

In step 901, the tracking engine can execute a pull-in stage. In this pull-in stage, the tracking engine reduces frequency error from the PLL by pulling the center frequency of the PLL toward the Doppler frequency recovered by the acquisition engine by setting the PLL loop bandwidth to an initial value. In one embodiment, an initial value is 40 Hz.

Next, in step 902, the tracking engine can determine if the PLL loop has converged. The tracking engine determines convergence by comparing the change in the average PLL output with its root-mean-square (RMS) variation. To compute the average and the RMS variation, the tracking engine divides the PLL output into consecutive periods. Each consecutive period is called an integration time. The tracking engine computes the arithmetic average and RMS frequency variation of the PLL output for each period. The tracking engine normalizes change in the average PLL output for the period by the period variation. If this ratio is smaller than a certain threshold, then the tracking engine considers PLL output to have converged. In one embodiment, the threshold is determined by the received GPS signal quality and strength. The tracking engine assigns lower thresholds to GPS signals with relatively greater signal quality and relatively greater signal strength. The period size and threshold are parameters that may be optimized based on signal conditions.

If the tracking engine determines that the PLL loop has converged, then in step 903, the tracking engine tests for false convergence. False convergence is tested by comparing the power of the in-phase component to the power of the quadrature component of the frequency and phase corrected GPS satellite signal. If the power ratio of the in-phase component to the quadrature component is smaller than a certain threshold, then PLL has not actually locked to the correct frequency, and false convergence is declared. Returning to step 902, if the tracking engine determines that the PLL loop has not converged, then the method returns to step 901.

Returning to step 903, if the PLL loop shows false convergence, then in step 904 the tracking engine determines if the PLL has been set to the last possible setting. Different settings of the PLL correspond to different PLL loop filter coefficients, typically starting from a wider bandwidth and shorter correlation times, and moving toward a narrower bandwidth and longer correlation times. If the PLL has not been set to the last possible setting, then in step 905, the tracking engine selects the next PLL setting and the method then returns to step 901. If, on the other hand, in step 904 the tracking engine determines that the last PLL setting has been selected, then the method terminates in step 906 with a tracking failure. In this case, the GPS receiver may need to re-acquire the GPS satellite and perform technique 800 (FIG. 8).

Again, returning to step 903, if the tracking engine determines that the PLL loop does not show false convergence, then in step 907, the tracking engine performs the transition stage. In the transition stage, the tracking engine decreases the PLL loop bandwidth and increases the integration time relative to previous PLL loop bandwidths and integration times. In step 908, the tracking engine determines if the PLL has converged. The PLL convergence test of step 908 may be substantially similar to the PLL convergence test described in step 902. If the PLL loop has not converged, the method returns to step 908. If, on the other hand, the PLL loop has converged, then in step 909, the tracking engine performs the tracking stage. In the tracking stage, the PLL loop bandwidth and the integration times remain fixed. After performing the tracking stage, in step 910 the tracking engine determines if the PLL is diverging. PLL Divergence may be detected similar to false convergence detection, namely using the power ratio between in-phase and quadrature components, but with a different threshold. If the PLL is diverging, then the method returns to step 901. If the PLL loop is not diverging, then the method returns to step 909.

In the foregoing specification, the present embodiments have been described with reference to specific exemplary embodiments thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

The invention claimed is:

1. A method of tracking a Global Positioning Satellite (GPS) signal, the method comprising:
   executing a pull-in stage by setting a center frequency of a phase-locked loop (PLL) having an initial bandwidth to a Doppler frequency of the GPS signal;
   determining whether the PLL has converged in a first occurrence over an initial integration time;
   determining whether the PLL has false convergence by comparing a power of an in-phase component to a power of a quadrature component of the GPS signal if the PLL has converged in the first occurrence;
   executing a transition stage by decreasing the initial bandwidth and increasing the initial integration time if the PLL does not have false convergence;
   determining whether the PLL has converged in a second occurrence after execution of the transition stage; and
   executing a tracking stage by fixing a decreased bandwidth for the PLL and an increased integration time if the PLL has converged in the second occurrence.

2. The method of claim 1, wherein determining whether the PLL has converged comprises:
   comparing a change in an average PLL output with a root-mean-square variation of the PLL output.

3. The method of claim 1, further comprising:
   returning to executing the transition stage if the PLL has not converged in the second occurrence.

4. The method of claim 1, further comprising:
   returning to executing the pull-in stage if the PLL has not converged in the first occurrence.

5. The method of claim 1, further comprising:
   determining whether the PLL is set to a last possible setting if the PLL does have false convergence, wherein the last possible setting corresponds to a narrowest bandwidth for the PLL and a maximum integration time; and
   using another PLL setting and returning to executing the pull-in stage if the PLL is not set to the last possible setting.

6. The method of claim 5, further comprising:
   terminating the method with a tracking failure if the PLL is set to the last possible setting.

7. The method of claim 1, further comprising:
   in response to executing the tracking stage, determining whether the PLL is diverging;
   returning to executing the pull-in stage if the PLL is diverging; and
   returning to executing the tracking stage if the PLL is not diverging.

8. A tracking engine for tracking a Global Positioning Satellite (GPS) signal, the tracking engine comprising:
   means for executing a pull-in stage by setting a center frequency of a phase-locked loop (PLL) having an initial bandwidth to a Doppler frequency of the GPS signal;
   means for determining whether the PLL has converged in a first occurrence over an initial integration time;
   means for determining whether the PLL has false convergence by comparing a power of an in-phase component to a power of a quadrature component of the GPS signal if the PLL has converged in the first occurrence;
   means for executing a transition stage by decreasing the initial bandwidth and increasing the initial integration time if the PLL does not have false convergence;
   means for determining whether the PLL has converged in a second occurrence after execution of the transition stage; and
   means for executing a tracking stage by fixing a decreased bandwidth for the PLL and an increased integration time if the PLL has converged in the second occurrence.

9. The tracking engine of claim 8, wherein the means for determining whether the PLL has converged is to compare a change in an average PLL output with a root-mean-square variation of the PLL output.

10. The tracking engine of claim 8, further comprising:
    means for returning to execution of the transition stage if the PLL has not converged in the second occurrence.

11. The tracking engine of claim 8, further comprising:
    means for returning to execution of the pull-in stage if the PLL has not converged in the first occurrence.

12. The tracking engine of claim 8, further comprising:
    means for determining whether the PLL is set to a last possible setting if the PLL does have false convergence, wherein the last possible setting corresponds to a narrowest bandwidth for the PLL and a maximum integration time; and
    means for using another PLL setting and returning to executing the pull-in stage if the PLL is not set to the last possible setting.

13. The tracking engine of claim 12, further comprising:
    means for indicating a tracking failure if the PLL is set to the last possible setting.

14. The tracking engine of claim 8, further comprising:
    means for determining whether the PLL is diverging in response to executing the tracking stage;
    means for returning to execution of the pull-in stage if the PLL is diverging; and
    means for returning to execution of the tracking stage if the PLL is not diverging.

15. A Global Positioning Satellite (GPS) receiver for tracking a GPS signal, the GPS receiver comprising:
    an antenna to receive the GPS signal; and
    a tracking engine to:
      execute a pull-in stage by setting a center frequency of a phase-locked loop (PLL) having an initial bandwidth to a Doppler frequency of the GPS signal;
      determine whether the PLL has converged in a first occurrence over an initial integration time;
      determine whether the PLL has false convergence by comparing a power of an in-phase component to a power of a quadrature component of the GPS signal if the PLL has converged in the first occurrence;
      execute a transition stage by decreasing the initial bandwidth and increasing the initial integration time if the PLL does not have false convergence;
      determine whether the PLL has converged in a second occurrence after execution of the transition stage; and
      execute a tracking stage by fixing a decreased bandwidth for the PLL and an increased integration time if the PLL has converged in the second occurrence.

16. The GPS receiver of claim 15, wherein the tracking engine is to determine whether the PLL has converged by:
    comparing a change in an average PLL output with a root-mean-square variation of the PLL output.

17. The GPS receiver of claim 15, wherein the tracking engine is to further:
   return to executing the transition stage if the PLL has not converged in the second occurrence.

18. The GPS receiver of claim 15, wherein the tracking engine is to further:
   return to executing the pull-in stage if the PLL has not converged in the first occurrence.

19. The GPS receiver of claim 15, wherein the tracking engine is to further:
   determine whether the PLL is set to a last possible setting if the PLL does have false convergence, wherein the last possible setting corresponds to a narrowest bandwidth for the PLL and a maximum integration time; and
   use another PLL setting and returning to executing the pull-in stage if the PLL is not set to the last possible setting.

20. The GPS receiver of claim 19, wherein the tracking engine is to further:
   indicate a tracking failure if the PLL is set to the last possible setting.

21. The GPS receiver of claim 15, wherein the tracking engine is to further:
   determine whether the PLL is diverging in response to executing the tracking stage;
   return to executing the pull-in stage if the PLL is diverging; and
   return to executing the tracking stage if the PLL is not diverging.

* * * * *